Jan. 24, 1956
E. M. STEFACEK
2,731,725
OPTICAL TEST APPARATUS FOR MEASURING
THE FAT CONTENT OF LIQUIDS
Filed Nov. 20, 1953
2 Sheets-Sheet 1
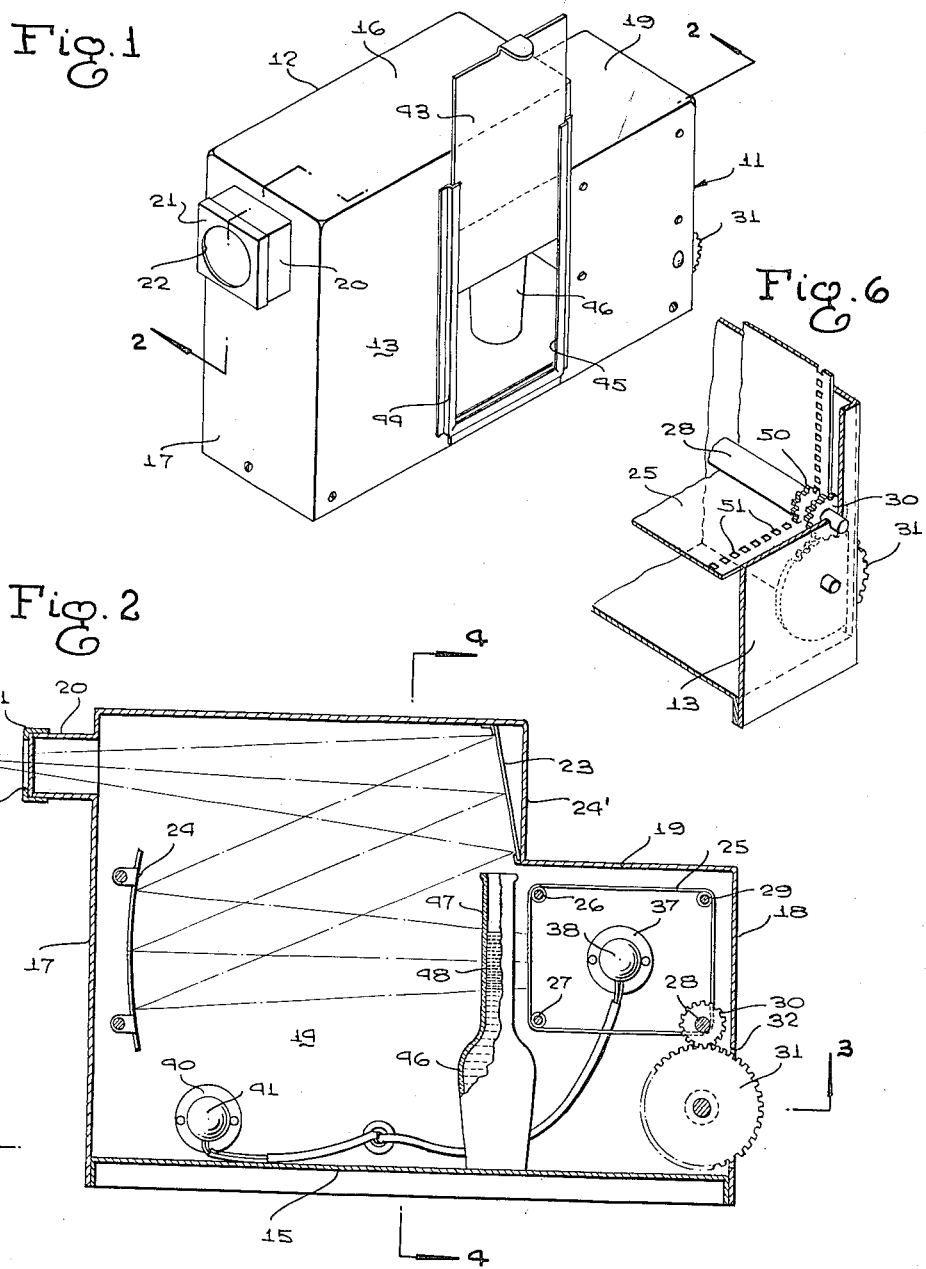
INVENTOR.
EUGENE M. STEFACEK
BY
McMorrow, Berman & Davidson
ATTORNEYS

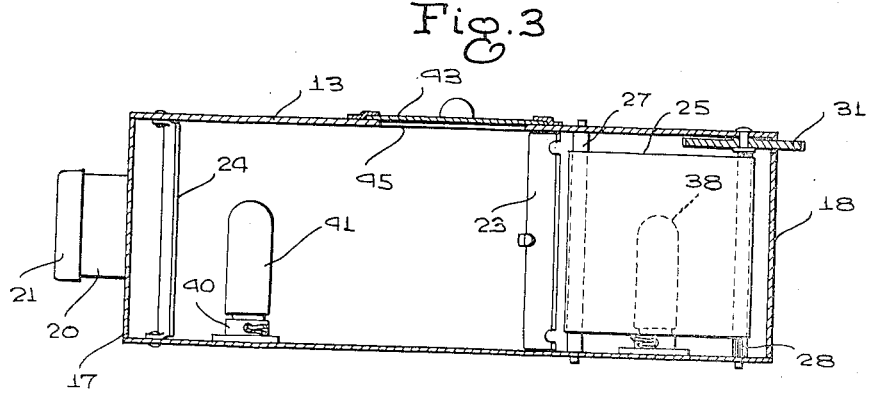
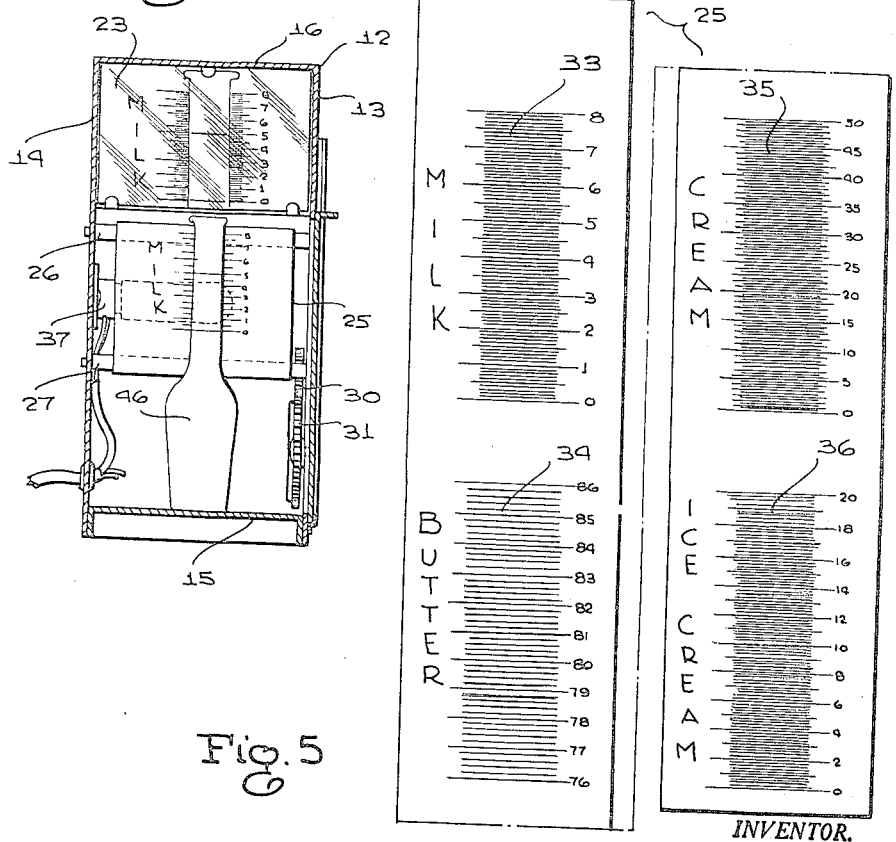

United States Patent Office 2,731,725
Patented Jan. 24, 1956

2,731,725

OPTICAL TEST APPARATUS FOR MEASURING THE FAT CONTENT OF LIQUIDS

Eugene M. Stefacek, Omaha, Nebr.

Application November 20, 1953, Serial No. 393,253

3 Claims. (Cl. 33—125)

This invention relates to instruments for measuring the fat content of liquid, and more particularly to an improved optical device for measuring the percentage of fat in liquids such as milk, cream, or the like.

The main object of the invention is to provide a novel and improved optical test apparatus for measuring the fat content of liquids, said apparatus being simple in construction, being easy to operate, and providing an accurate measurement of the percentage of fat in liquids such as milk, cream, or the like.

A further object of the invention is to provide an improved optical apparatus for measuring the fat content of liquids, said apparatus involving inexpensive components, being light in weight, being compact in size, being easily adjustable to change its scale in accordance with the liquid being tested, and being easy to read.

Further objects and advantages of the invention will become apparent from the following description and claims, and from the accompanying drawings, wherein;

Figure 1 is a perspective view of an optical test apparatus constructed in accordance with the present invention, the closure plate of the apparatus being shown in partly elevated position.

Figure 2 is a vertical longitudinal cross sectional view taken on the line 2—2 of Figure 1.

Figure 3 is a horizontal cross sectional view taken on the line 3—3 of Figure 2.

Figure 4 is a vertical transverse cross sectional view taken on the line 4—4 of Figure 2.

Figure 5 is a plan view of the calibrated scale strip employed in the test apparatus of Figures 1 to 4.

Figure 6 is a perspective fragmentary view showing the sprocket driving means for the scale strip in the test apparatus of Figures 1 to 4.

Referring to the drawings, the test apparatus is designated generally at 11 and comprises a housing 12 of suitable opaque material, such as sheet metal, or the like, said housing having the side walls 13 and 14, the bottom wall 15, the top wall 16, the front end wall 17, and the rear end wall 18. The top wall 16 is downwardly offset at its rear portion, as shown at 19, whereby the rear portion of housing 12 is reduced in height as compared with the remaining portion of said housing.

The front wall 17 is provided at its upper portion with the rectangular viewing tube 20, said tube having the front cap 21 formed with the circular viewing aperture 22 through which the observer may view the interior of the housing. Designated at 23 is the inclined plane mirror secured to the forwardly offset vertical rear wall portion 24', said plane mirror 23 being substantially in the field of view of the viewing tube 20, as shown in Figure 2. Designated at 25 is a concave mirror toward which the plane mirror 23 is inclined, as shown in Figure 2, said concave mirror 24 being secured in the housing 12 adjacent the front wall 17 thereof.

Designated at 25 is an endless strip of translucent material which is supported on the respective transverse shaft elements 26, 27, 28 and 29 secured between the side walls 14 and 13 in the reduced rear portion of the housing, as shown in Figure 2. Rigidly secured on shaft 28 is a sprocket wheel 50 which drivingly engages sprocket openings 51 formed in the strip 25 adjacent one margin thereof. The shafts 26 to 29 are freely rotatable, whereby the strip 25 may be freely moved around a substantially rectangular path defined by said shafts, as shown in Figure 2. Secured on the shaft 28 adjacent the side wall 14 is the pinion gear 30 which meshes with the larger gear 31 journaled in the side wall 14 and projecting through a vertical slot 32 in the rear wall 18, whereby the gear 31 may be manually rotated, causing the gear 30 to be rotated and thus causing the sprocket wheel 50 on shaft 28 to move the strip 25.

The strip 25 is provided with a series of calibrated scales, shown in Figure 5, at 33 to 36, said scales being calibrated in accordance with the fat content of various liquids, such as milk, butter, cream and ice cream, to be tested.

Mounted on the side wall 14 is a lamp socket 37 in which is disposed the horizontally extending lamp 38, the socket 37 and lamp 38 being located inside the endless translucent scale chart 25 so as to illuminate said chart when the lamp 38 is energized. An additional lamp socket 40 is mounted on the side wall 14 in the forward lower portion of the housing, said socket 40 containing the lamp 41 arranged horizontally, as shown in Figure 2, and being located below the concave mirror 24.

The side wall 13 is provided with the vertically movable closure plate 43, said closure plate being slidably engaged in a closure frame 44 secured to the side wall 13 around a rectangular closure aperture 45, said aperture being opened when the plate 43 is elevated in the manner shown in Figure 1. Designated at 46 is a test flask having a restricted top neck portion 47, said flask being adapted to contain the liquid under test and being arranged so the fat will rise into the restricted neck portion 47.

As shown in Figure 2, the mirror 24 is directed so that the illuminated image of the neck portion 47 of the vessel 46 will be reflected therefrom to the plane mirror 23, and will be thence reflected toward the viewing tube 20, the image being magnified by the concave mirror 24. The vessel 46 is positioned immediately in front of the forward vertical portion of the chart strip 25, as shown in Figure 2, the vessel 46 being movable into this position through the closure opening 45, said closure opening being located laterally adjacent to the forward vertical portion of said scale chart, as is clearly shown in Figure 3.

In using the apparatsu the liquid under test is placed in the flask 46 and the said flask is disposed in the position thereof illustrated in Figure 2, namely with the restricted neck portion 47 thereof located forwardly adjacent the vertical forward portion of the scale chart 25. The lamps 41 and 38 are illuminated, and then the scale chart 25 is adjusted so that the starting reference mark of the appropriate scale is located adjacent the lower meniscus of the stratum of fat 48 in the neck portion 47. The adjustment is made by viewing the illuminated neck portion 47 and vertical forward portion of the chart strip 25 through the viewing tube 20 while manipulating the adjusting gear 31. With the lower reference mark of the appropriate scale thus situated, the percentage fat content may be read directly by observing the location of the top meniscus of the stratum of fat 48 with respect to the scale rearwardly adjacent thereto.

While a sliding closure 43 has been disclosed in the specific embodiment of the invention described above, obviously, any suitable type of closure may be employed in place thereof within the spirit of the present invention. Thus, instead of a sliding closure, a hinged closure or door may be employed, said closure or door opening laterally to provide access to the interior of the housing through the closure opening 45.

While a specific embodiment of an improved optical test apparatus for measuring the content of liquids has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. An optical test apparatus for measuring the fat content of liquids comprising a support, a vessel having a restricted upper portion and adapted to contain liquid under test, a scale chart, said chart comprising a flexible endless strip of material adjustably mounted on said support and having a calibrated portion, said vessel being arranged with said restricted upper portion thereof adjacent said calibrated portion of said scale chart in a position to be viewed thereagainst, said scale chart having a starting reference mark, and means for moving said chart to register said reference mark with a desired location on said restricted portion of the vessel.

2. An optical test apparatus for measuring the fat content of liquids comprising a support, a vessel having a restricted upper portion and adapted to contain liquid under test, a translucent scale chart, said chart comprising a flexible endless strip of material adjustably mounted on said support and having a calibrated portion, said vessel being arranged with said restricted upper portion thereof adjacent said scale chart calibrated portion in a position to be viewed thereagainst, said scale chart having a starting reference mark, a lamp mounted on said support behind said scale chart calibrated portion in a position to illuminate said calibrated portion, and means for moving said chart to register said reference mark with a desired location on said restricted portion of the vessel.

3. An optical test apparatus for measuring the fat content of liquids comprising an opaque housing, a viewing tube on said housing for viewing the interior thereof, a vessel having a restricted vertical upper portion and being adapted to contain liquid under test, a translucent scale chart, said chart comprising a flexible endless strip of material adjustably mounted in said housing and having a vertical calibrated portion, said vessel being arranged with said vertical restricted upper portion thereof forwardly adjacent said scale chart vertical portion in a position to be viewed thereagainst, said scale chart having a starting reference mark, a lamp mounted in said housing behind said scale chart vertical portion to illuminate said scale chart vertical portion, a concave mirror mounted in said housing forwardly of said vessel in a position to receive light from said scale chart vertical portion, another mirror mounted in said housing opposite said concave mirror in a position to receive light from said concave mirror and in the field of view of said viewing tube, means supporting said strip for movement around said lamp, said means including a rotary transverse shaft journaled in the opposite side of the housing, and a rotary disc member journaled in and projecting from said housing and being coupled to said shaft for moving said chart to register said reference mark with the desired location on said restricted portion of the vessel.

References Cited in the file of this patent

UNITED STATES PATENTS

| | | |
|---|---|---|
| 1,604,071 | Peterson | Oct. 19, 1926 |
| 1,611,448 | Hortvet | Dec. 21, 1926 |
| 2,267,960 | Tice | Dec. 30, 1941 |
| 2,498,030 | Davis | Feb. 21, 1950 |